United States Patent

Herger et al.

[15] 3,679,841

[45] July 25, 1972

[54] MAGNETIC TAPE HEAD SKEW ADJUSTMENT

[72] Inventors: Zoltan L. Herger, Northglenn; Dennis R. Olmsted, Westminster, both of Colo.

[73] Assignee: Storage Technology Corporation, Boulder, Colo.

[22] Filed: April 30, 1970

[21] Appl. No.: 33,366

[52] U.S. Cl. ....................179/100.2 CA

[51] Int. Cl. ....................G11b 5/56

[58] Field of Search ....................179/100.2 CA, 100.2 K; 274/4 A, 11 A

[56] References Cited

UNITED STATES PATENTS 2,943,860 7/1960 D'Arcy ....................274/4 A 2,574,707 11/1951 Pettus et al. ....................179/100.2 CA 3,531,126 9/1970 Tsukagoshi ....................274/4 A

*Primary Examiner*—Bernard Konick

*Assistant Examiner*—Jay P. Lucas

*Attorney*—Woodcock, Washburn, Kurtz & Mackiewicz

[57] ABSTRACT

Skew adjusting apparatus for a magnetic tape unit includes a right angle mounting plate for the magnetic head with one surface being curved with a radius of curvature having a center line coincidental with the center line of the tape path. The curved surface is biased toward two guiding pins. The mounting plate moves with the curved surface riding on the pins so that the magnetic head is rotated about the center line of the tape path.

1 Claim, 2 Drawing Figures

PATENTED JUL 25 1972

3,679,841

MAGNETIC TAPE HEAD SKEW ADJUSTMENT

BACKGROUND OF THE INVENTION

This invention relates to a skew adjustment for a magnetic tape unit and more particularly to apparatus for mounting the magnetic read-write head to provide rotation of the magnetic head about a point in the center line of the tape path.

In magnetic tape recording and reproducing systems the skew of the magnetic head must be adjusted to average out head read-write center line imperfections. In the past, magnetic heads have been adjusted by rotating them about a point at the edge of the head, or even further from the center of the tape path. When the magnetic head is pivoted about such a point, the center of the magnetic head is displaced from the center line of the tape path. The tape path over the head is altered.

SUMMARY OF THE INVENTION

In accordance with an important aspect of this invention the tape head skew adjusting mount rotates the head about a point on the center line of the tape path. Because of this, the tape path over the head is not altered by skew adjustment.

One of the advantages of this invention is that the skew adjustment means maintains the coincidence between the center line of the magnetic head and the center line of the magnetic tape at all times.

In accordance with another aspect of this invention the skew adjustment vernier and the locking screw are separated. Because of this the skew adjustment can be locked while the adjustment is maintained with the vernier screw. In prior art adjustments, a locking system incorporated on the adjusting screw is used. In such systems the previously obtained skew settings can be altered during the locking operations.

Another advantage of this invention is that the magnetic tape head mount is very stable and capable of adjustment to precisely the desired position.

DESCRIPTION OF A PARTICULAR EMBODIMENT

The figures show a portion of a magnetic tape unit including a magnetic head 10 and a magnetic tape 11 which is driven along the tape path. The tape path is fixed with respect to the reference datum 12.

Figure 1:
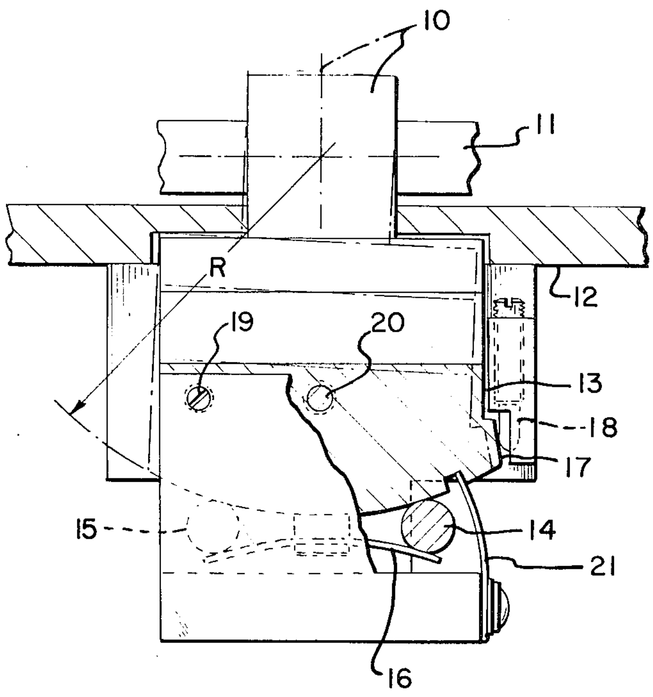
FIG. 1 shows a plan view of the skew adjustment apparatus.
Figure 2:
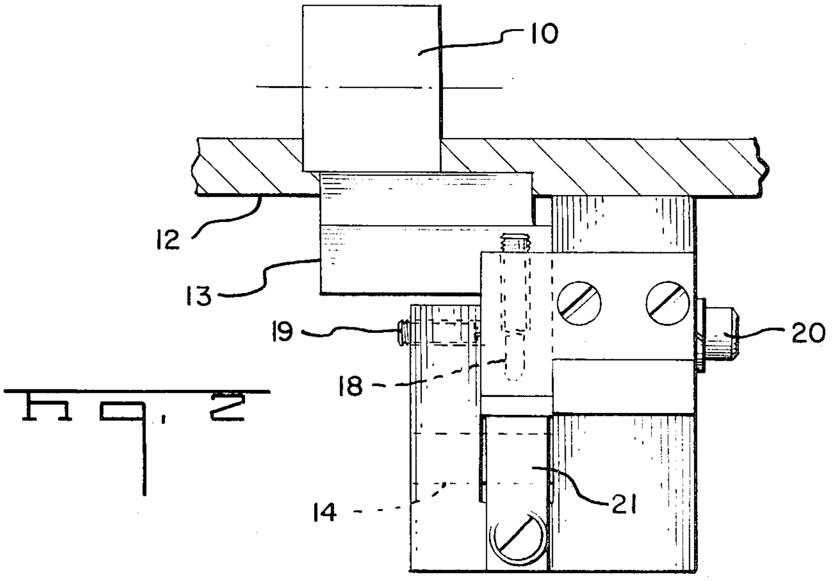
FIG. 2 shows a side view of the skew adjustment apparatus.

The magnetic head 10 is mounted on a right angle plate 13. The magnetic head is mounted on one angle of the right angle plate while the other angle rides in a slot in the main head mount. The other angle has a curved surface. The curved surface has a radius of curvature with a center line which is coincidental with the center line of the tape path. As shown in FIG. 1, the center of the radius of curvature is also in the center of the head 10.

The curved surface of the right angle plate rides against dowel pins 14 and 15 mounted in the main head mount. These dowel pins provide means for guiding the curved surface of the plate 13 in movement which rotates the magnetic tape head 10 about a point which lies in the center line of the tape path.

The right angle plate 13 is biased toward the pins 14 and 15 by a leaf spring 16 which is mounted on the plate 13 and which works against the opposite sides of the pins 14 and 15.

A vernier screw 18 is threadably mounted in a block which in turn is mounted to the main head mount. The side of the other angle of the right angle plate has a protrusion 17 angled away from the side. This angled surface 17 bears against the end of vernier adjustment screw 18.

The right angle plate 13 is biased toward the vernier adjustment screw 18 by a leaf spring 21 which is mounted on the main head block. One end of the leaf spring 21 is disposed in a notch in the curved surface of the mounting plate to bias the mounting plate toward the vernier screw.

Spring plungers, including the spring plunger 19, load the right angle plate 13 against the registering surface on the main head mount. A locking screw 20 extends through the main head mount and locks the right angle plate in a position to which it has been set by adjustment of the vernier screw 18.

A skew adjustment is made in the following manner. The locking screw 20 is loosened. With the locking screw 20 loosened, the spring forces now control head stability. Spring plunger 19 loads the angle plate 13 against the registering surface on the head mount; spring 16 loads the plate against the dowel pins 14 and 15; and spring 21 loads the angle plate against the vernier screw 18. This eliminates head oscillations during the adjustment procedure. The vernier adjustment screw 18 is rotated to obtain the proper head alignment. Then the locking screw 20 is tightened to maintain the settings.

During skew adjustment the head 10 is pivoted about a point in the center line of the tape path. This is as contrasted to other skew adjustment devices which pivot or gyrate the head about a center which is outside the tape center line. The advantage of this invention is that coincidence between tape center line and head center line is maintained at all times. The tape path over the head is not altered by skew adjustment.

Another advantage is that the adjustment vernier 18 is separated from the locking screw 20. Because of this the adjustment made with the vernier screw 18 can be maintained while it is being locked with the locking screw 20.

While a particular embodiment of the invention has been shown and described modifications are within the true spirit and scope of the invention. The appended claims are intended to cover such modifications.

What is claimed is:

1. Skew adjusting apparatus for a magnetic tape unit in which a magnetic tape is driven along a tape path comprising:
   - a magnetic tape head,
   - a mounting plate, said magnetic head being mounted on one surface of said mounting plate, another surface of said plate being curved with a radius of curvature having a center line coincidental with the center line of said tape path, said mounting plate having a notch in the other surface thereof,
   - guide means mounted on said magnetic tape unit for guiding the curved surface of said plate in movement which rotates said magnetic tape head about a point which lies in the center line of said tape path,
   - a vernier screw threadably mounted on said magnetic tape unit, said mounting plate having a surface which is angled to bear against an end of said vernier screw, rotation of said vernier screw causing movement of said mounting plate so that said head rotates about said center line of said tape path, and
   - a spring having one end disposed in said notch for biasing said mounting plate toward said vernier screw.

* * * * *